Nov. 26, 1963 A. J. EISENBERG 3,112,224

APPARATUS FOR DISPENSING PREDETERMINED LENGTHS
OF TAPE, PARTICULARLY CARRIER-RIBBON-TYPE TAPE

Filed Jan. 6, 1960 8 Sheets-Sheet 1

Inventor:
Arnold J. Eisenberg,
by Emery, Booth, Townsend, Miller + Weidner
Att'ys Inventor:
Arnold J. Eisenberg,
by Emery, Booth, Townsend, Miller & Weidner
Attys Nov. 26, 1963 A. J. EISENBERG 3,112,224

APPARATUS FOR DISPENSING PREDETERMINED LENGTHS OF TAPE, PARTICULARLY CARRIER-RIBBON-TYPE TAPE

Filed Jan. 6, 1960 8 Sheets-Sheet 3

Inventor:
Arnold J. Eisenberg
by Emery, Booth, Townsend, Miller & Weidner
Attys

Nov. 26, 1963 A. J. EISENBERG 3,112,224

APPARATUS FOR DISPENSING PREDETERMINED LENGTHS OF TAPE, PARTICULARLY CARRIER-RIBBON-TYPE TAPE

Filed Jan. 6, 1960 8 Sheets-Sheet 4

Inventor:
Arnold J. Eisenberg,
by Emery, Booth, Townsend, Miller & Weidner
Attys Nov. 26, 1963 A. J. EISENBERG 3,112,224

APPARATUS FOR DISPENSING PREDETERMINED LENGTHS OF TAPE, PARTICULARLY CARRIER-RIBBON-TYPE TAPE

Filed Jan. 6, 1960 8 Sheets-Sheet 5

Inventor:
Arnold J. Eisenberg,
by Emery, Booth, Townsend, Miller & Weidner
Att'ys Inventor:
Arnold J. Eisenberg,
by Emery, Booth, Townsend, Miller & Weidner
Att'ys Inventor:
Arnold J. Eisenberg,
by Emery, Booth, Townsend, Miller & Weidner
Attys Inventor:
Arnold J. Eisenberg,
by Emery, Booth, Townsend, Miller & Weidner
Att'ys 3,112,224

APPARATUS FOR DISPENSING PREDETERMINED LENGTHS OF TAPE, PARTICULARLY CARRIER-RIBBON-TYPE TAPE

Arnold J. Eisenberg, Nashua, N.H., assignor to Nashua Corporation, Nashua, N.H., a corporation of Delaware Filed Jan. 6, 1960, Ser. No. 819
11 Claims. (Cl. 118—6)

The present invention relates to machines and apparatus for dispensing adhesively conditioned lengths of flexible strip and tape material for application to packages, bundles, boxes and the like and similar uses. More particularly it aims to provide new and improved means whereby predetermined and accurately controlled lengths of the tape are automatically delivered to the user in successive power-actuated operating cycles upon call by the operator.

An important application of the invention is for the dispensing of uniform determined lengths of tape of the so-called carrier-ribbon type comprising unit lengths of an adhesively conditionable main or base tape having incorporated with it a flexible ribbon or like element presenting a loop thereof adapted to serve as a manual grip or bowed handle for convenient carriage of articles to which the carrier tape units are applied.

In the drawings illustrating one example of tape dispensing means embodying the invention:

FIGS. 6, 7 and 8 are detail perspective views looking at the upper fore portion of the machine, with cover open, showing different positions of certain feed, severing and cycle-terminating means, wherein FIG. 6 shows the movable blade depressed to expose the position of the cycle-terminating or trip switch;

FIG. 7 shows the parts with the machine running and a feeler of the cycle-terminating trip switch riding on the upper face of a unit of tape being delivered; and FIG. 8 shows a subsequent stage in an operating cycle approximately at the end thereof with the trip switch feeler dropped to effect actuation of the severing means and termination of the operating cycle;

FIGS. 10 to 16 illustrate a typical carrier-ribbon tape for dispensing of which the machine is specially equipped and wherein:

FIG. 10 shows the top or non-gummed face of the tape, including two full unit lengths thereof;

FIG. 11 shows on a larger scale the opposite, under or gummed surface of one unit length of the tape;

FIG. 12 is a longitudinal section as on the line 12—12 of FIG. 11; and

FIGS. 13, 14, 15 and 16 are cross-sectional views as on the correspondingly numbered section lines of FIG. 12;

The present invention is useful with tape dispensing machines of the general class wherein tape from a roll supply is advanced by and between feed rolls and past severing means and means for adhesively conditioning a face of the tape, the tape being delivered to the user in lengths adhesively conditioned for use. As already mentioned the invention is especially concerned with the serving of uniform determined lengths of the adhesively conditionable tape and particularly carrier-ribbon tape of which an example is shown separately in detail in FIGS. 10 to 16 hereof. The invention is applicable to tape dispensing machines generally including those in which the feed and other actions are accomplished by a manual operating lever or crank. The dispensing machine selected for the purposes of the present invention disclosure is of the motorized or power-driven automatic or semi-automatic type as for example that of the Doyle, Eisenberg and McDermott application Serial No. 845,126, filed October 8, 1959, now Patent No. 3,076,586. The general construction and arrangement for the machine as a whole accordingly may be regarded as similar to that of the base machine of said application.

Figure 7:
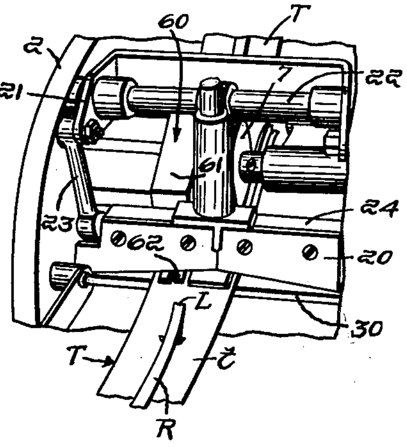
Figure 8:
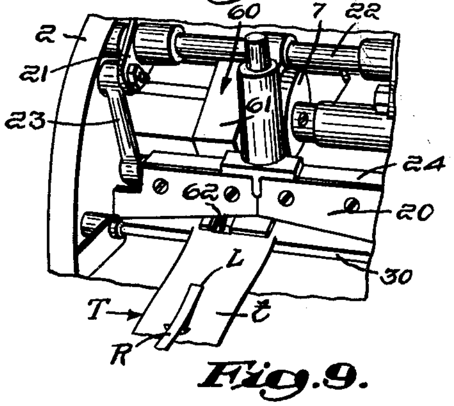
Figure 9:
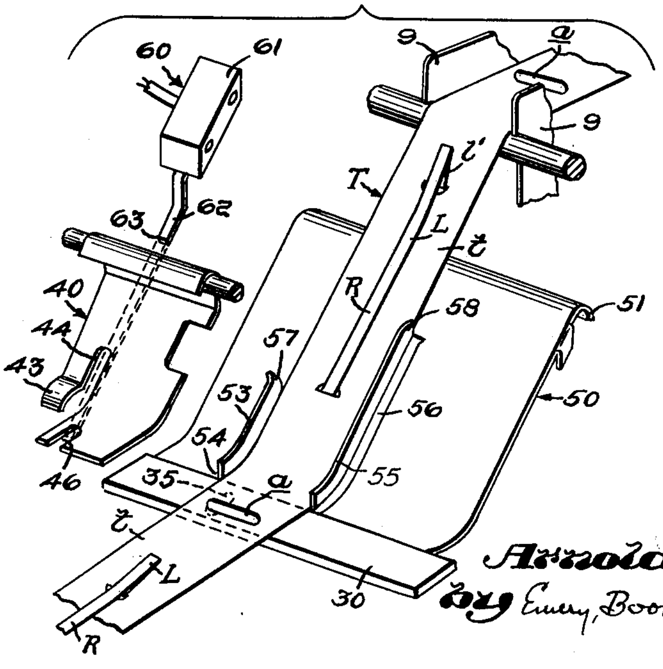
FIG. 9 is an exploded view of certain guide means and illustrating the relation of the trip switch feeler thereto and to the tape.

It comprises a main frame or housing with side frames 2 on or between which the several operating elements and sub-assemblies are mounted. At the rear of the machine is a holder well 3 for a roll supply S, FIG. 4, of the tape to be dispensed. From the rotatably supported supply roll S the tape T, portions of which are seen in FIGS. 7 to 9 and separately in FIGS. 10 to 16, is advanced through and also special guide means shown separately in FIG. 9, herein particularly adapted for cooperation with the mentioned carrier-ribbon type of the adhesive strip material.

Figure 1:
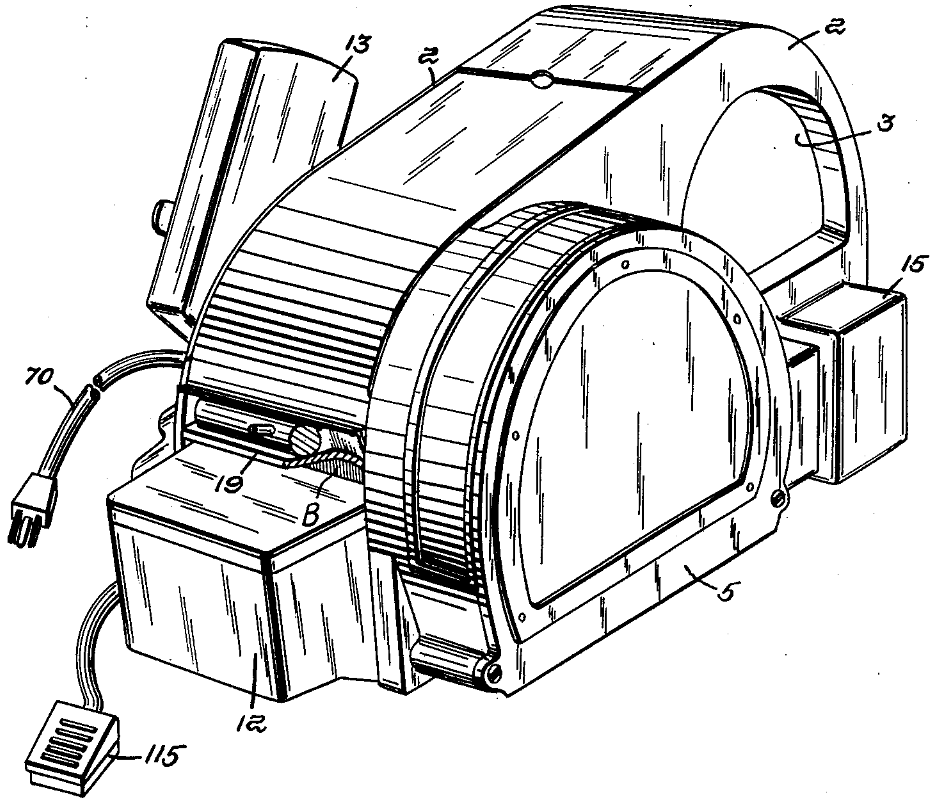
FIG. 1 is a perspective view of the machine as a whole.
Figure 2:
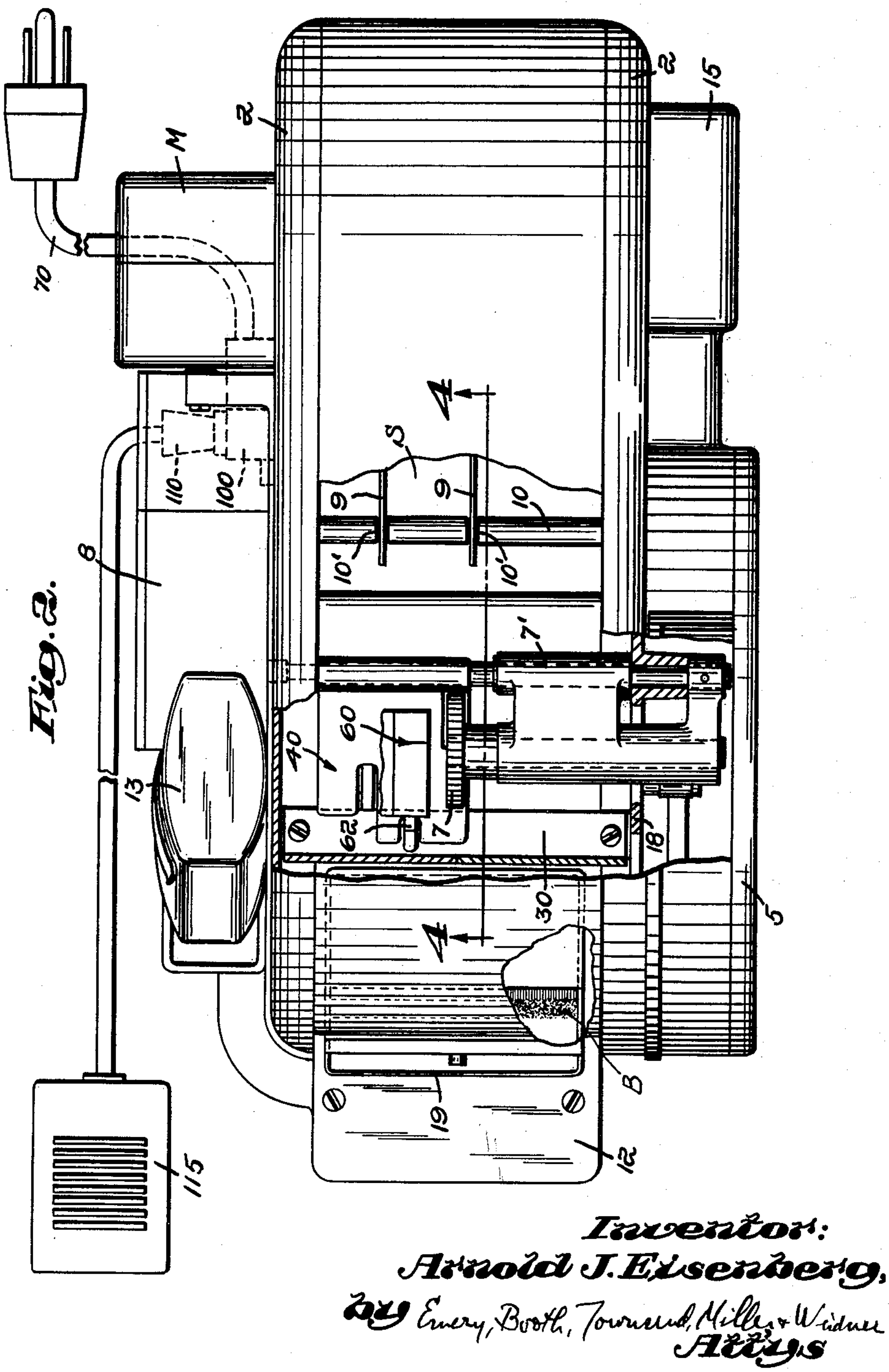
FIG. 2 is a top plan view of the same with portions of the top cover broken away.
Figure 3:
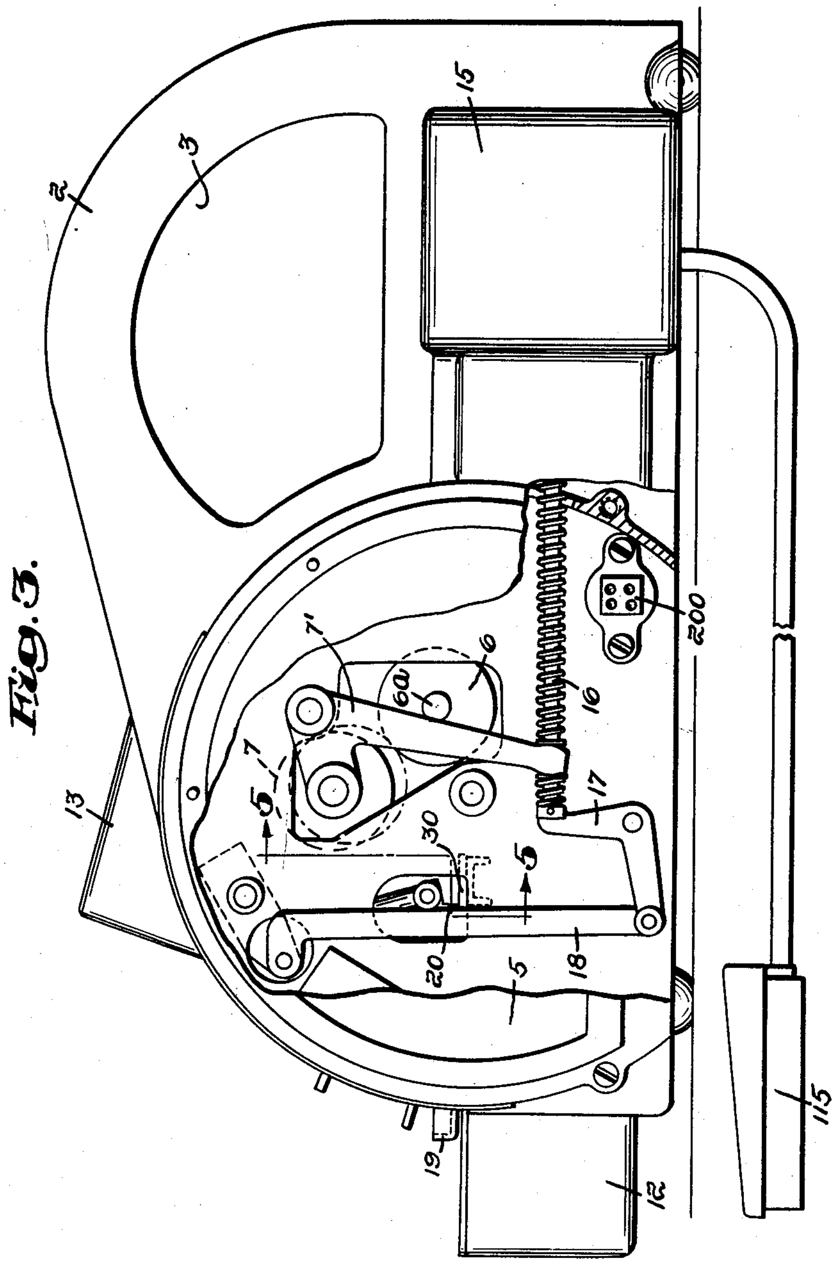
FIG. 3 is a right side elevation with a side cover plate removed.
Figure 4:
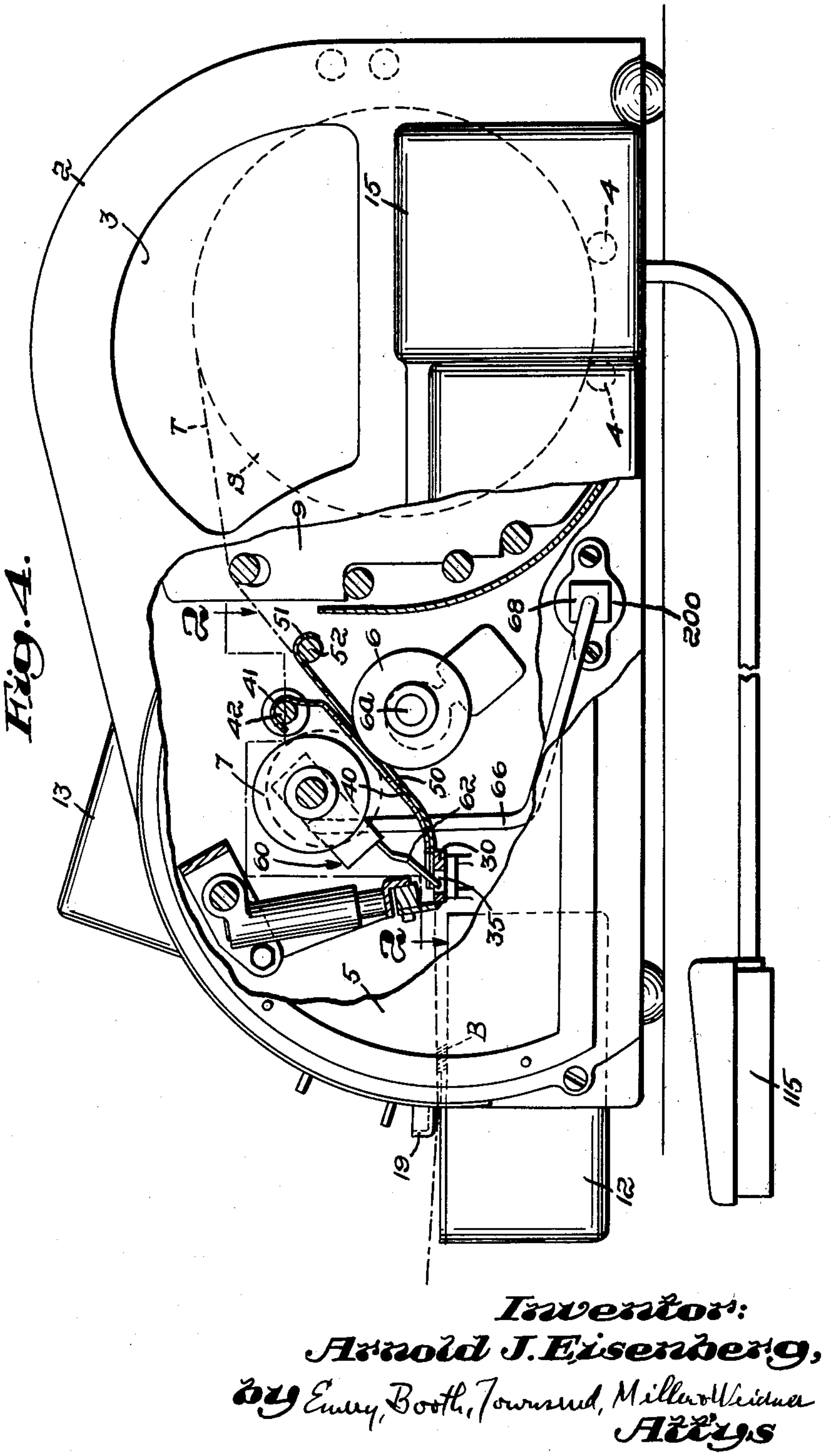
FIG. 4 is a view generally similar to FIG. 3 partly in side elevation and partly in vertical longitudinal section approximately central of the machine.
Figure 5:
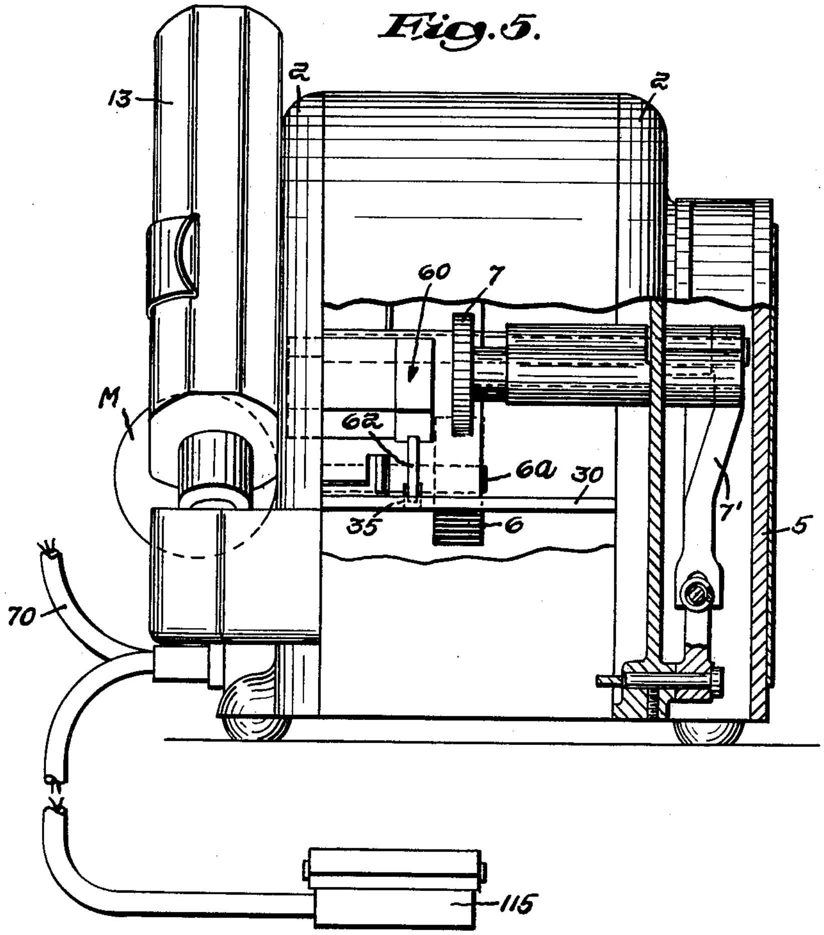
FIG. 5 is a front elevation partly in transverse section.
Figure 6:
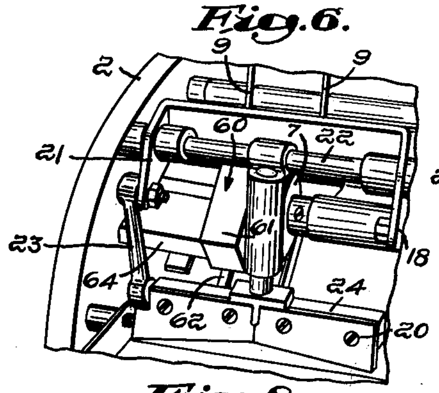

The advance of the tape is effected by a pair of separable feed rolls 6, 7 of which the herein lower feed roll 6 is power-driven, being mounted on a shaft *6a*, FIGS. 3 to 5, on the left-hand side frame 2. The outer end of said shaft extends into the gear box 8, FIG. 2, through which it has driven connection in known manner with the electric motor M similarly for example as in said application and in Patent No. 2,776,833 of January 8, 1957, noting FIG. 6 of the latter. Said lower driven feed roll 6 is of a width to underlie and support the tape over a substantial width thereof to each side of the longitudinal medial line of the tape.

The upper feed roll 7 is supported for bodily movement toward and from the driven roll 6 and as shown, see particularly FIGS. 2 and 5, is relatively narrow in relation to the driven roll 6 for cooperative feeding engagement with a particular longitudinal zone of the tape T to be advanced between the rolls when feedingly engaged, said tape zone herein being toward the right of the median line of the tape. Said upper roll 7 is rotatably mounted on the forwardly extending arm of a bellcrank 7′, FIG. 3, the other arm of which is operatively engaged with an actuator 16 adapted at each operating cycle of the machine to close this normally retracted roll 7 into tape-feeding relation with the driven roll 6. Such actuator comprises the spring-loaded reciprocable rod 16 connected at the rear to an actuating solenoid indicated generally at 15, FIGS. 1 to 4, the actuator being operatively engaged at the forward end with the adjacent depending arm of said bellcrank 7′. This actuator 16 also is connected with one arm of a second two-arm lever 17, of which the other arm is connected to operate a vertical link 18, FIG. 3, by which the movable blade 20 of the tape severing means is vertically moved at the appropriate time in tape-severing coaction with a fixed blade 30. The described mechanism may be understood as generally similar to that of the application mentioned, reference also here being made to Patent No. 2,776,833 of January 8, 1957, for further showing and description of generally similar feeding, moistening and severing mechanism with which the present invention may be incorporated.

Forwardly beyond the severing means 20, 30 the tape is advanced beneath an adjustably weighted platen 19 overlying capillary moistener means B extending upwardly from a liquid reservoir 12 removably held on cross-supports on and between the front portions of the machine side frames 2. The level of the moistening liquid in the reservoir may be maintained in known manner from a replenishable supply in an automatic feeder flask 13 demountably located at the left side of the machine, FIGS. 1 and 2.

As stated the present invention is especially concerned with dispensing accurate unit lengths of the tape in predetermined and successively repeating length values as appropriate to a particular use. The particular example of such use as herein illustrated is for the mentioned carrier-ribbon type of tape. One commercially available example of such tape T is shown in FIGS. 10 to 16, being in general similar to that of U.S. Patent 2,137,913 of November 22, 1938, to O. Kind. It comprises the main or base tape proper *t* of a suitable weight and strength of paper or other flexible strip material, one face of which, referred to as the underface, FIG. 11, has a coating *g* of dry gum or the like adapted to be adhesively conditioned as by the application of moisture. This tape is provided with a longitudinal strand or ribbon R disposed along the longitudinal median zone of the tape *t*, in aligned but separated individual unit lengths as appropriate to form a loop or bow L accessible at the ungummed upperface of the tape T for use as a carrier handle when a unit length of the overall tape T is adhesively applied to a package, bundle or like article to be transported.

Figures 10, 11, 12, 13, 14, 15, 16:
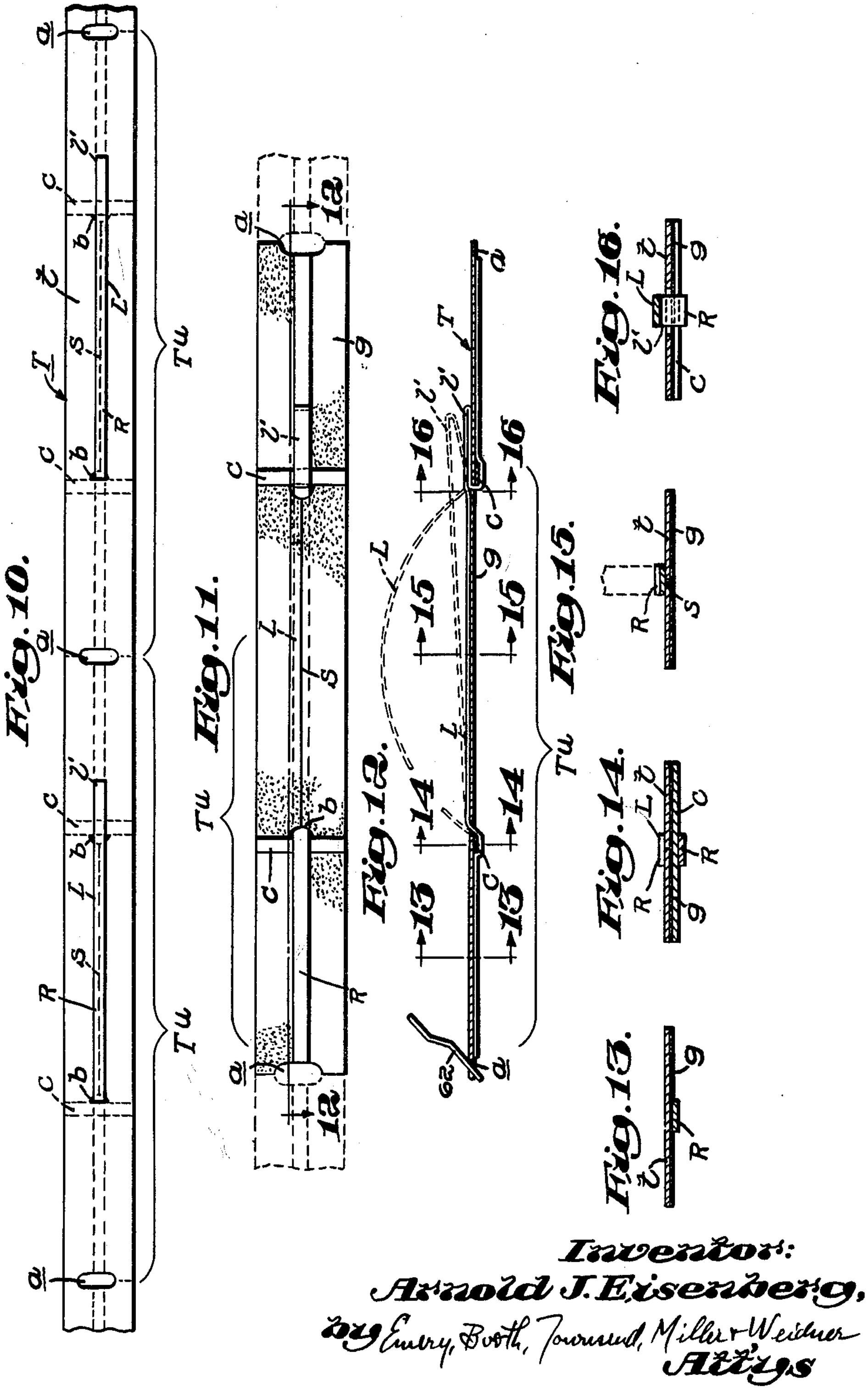

The dry-gummed tape T is provided with unit-length demarking registration apertures *a* herein equally spaced longitudinally of the tape for transverse severance thereof into the units T*u* each to constitute a handle-carried attaching strip or unit. Two such successive units T*u* are shown in FIG. 10 with portions of the preceding and following units at the respective ends of the view, with one severed unit shown separately in FIGS. 11 and 12. Such registration apertures *a* are in the form of transverse slots medially disposed widthwise of the main tape T and extending beyond the width of the relatively narrow carrier ribbon R to one or both sides of the latter. This carrier ribbon R may be of any flexible sheet or web construction of suitable strength for carrier-handle-forming purposes such as a strip or strand comprising a multiplicity of longitudinally extending threads of filaments laid parallel and integrally joined by a suitable vehicle or may be woven textile, paper, plastic or other fabric or strip material. In each carrier strip unit T*u* the ribbon R, which as stated is provided in pre-separated sections, one for each carrier unit T*u*, has a total length exceeding that of the unit sufficiently to provide at an intermediate longitudinal portion of the unit the mentioned handle or carrier unit L, FIG. 10, also FIG. 12 and the others. The carrier ribbon sections R are adhesively secured at the under gummed face of the tape *t*, medially along it with the respective ends terminating respectively at an adjacent pair of the unit length determining transverse apertures *a*. An intermediate and preferably central portion of each carrier strip unit T*u* has formed along the medial longitudinal line a slit *s*, FIGS. 10, 11 and 15, terminating in central enlargements or holes *b*, *b* enabling the longitudinal central portion of the ribbon R to pass from the under gummed face of the tape to which the ribbon end portions are anchored, to the upper and ungummed face of the tape *t*. Such exposed portion of the ribbon at upper face of each unit T*u* is greater than the length of the slit *s* and the distance between the slit terminal holes *b*, *b* and thus includes the excess length of the ribbon over that of the strip unit T*u*, enough to form a gripping loop or handle L as shown dotted at the upper portion of FIG. 12. Reinforcing pieces *c* may be provided at the gummed face of the tape *t* adjacent the margins of the slit enlargements *b* which are nearer the respective ends of the corresponding strip unit T*u* and transversely disposed between the gummed face *g* of the tape *t* and the underlying ribbon R, to resist the pulling force on the loop or handle portion L of the carrier tape unit T*u* when in use.

In the supply roll form comprising an indefinite or continuous length of the successive carrier tape units T*u*, each initially joined to the one preceding and that following at the non-apertured marginal portions of the tape *t* at the sides of the succeeding registration apertures *a*, the loop-forming or handle portion L of the ribbon R has the excessive length thereof folded down flatwise on itself at one or the other end of the handle portion as seen for example at *l'*, see particularly FIG. 10. While this folded portion may be at either end of the handle loop L, preferably the disposition of said fold in the roll is toward the rear or trailing portion of each unit T*u*. Likewise the roll may be wound with the gummed face either in or out. If wound gummed face out the tape supply roll such as S is positioned and rotatably supported in the machine well 3 for feed off from the bottom of the roll rearwardly and thence reversely upward and forwardly over a suitable guide roll (not shown) so as to conduct the tape to and between the feed rolls with the gummed face down. Conveniently and as shown in FIG. 4, the supply roll S is wound gummed face in and feeds directly forwardly from the top of the roll S along the dotted path as indicated at T in FIG. 4. Thus at the feed rolls and through the severing, moistening and delivery stations beyond them the tape is presented with the gummed face down, for travel over and in moistening relation to the brush or capillary moistener in the reservoir 12 and with the handle-forming loop L of the ribbon uppermost and the flat folded excess length portion of the latter having the closed end of the fold in rearward-extending or trailing position; see also FIGS. 7 and 9.

The nature and construction of the carrier-ribbon tape as in the example illustrated and described including the superposed or laminar nature of the tape and ribbon components and the presence of the flat-folded but freely projective loop or handle L of the carrier ribbon R present attendant problems in the feeding, guiding, length controlling, severing and adhesively moistened delivery of the determined unit lengths. In accordance with the present invention such difficulties inherent by reason of the special laminar nature and loose loop handle feature of the special tape to be dispensed in accurate unit lengths are satisfactorily overcome and in a manner whereby the base dispensing machine such as that of the mentioned copending application or of the Patent 2,776,833 referred to therein is adapted to the special use as here concerned.

The tape supply roll S is rotatably supported in the machine well 3 as upon rollers 4, 4, FIG. 4. For there positioning it transversely of the machine and in accurate alignment with the feeding and guiding means, supply roll aligning guides or plates 9 are provided, FIGS. 2 and 4, guidingly adjacent the tape roll S received between them. These plates are adjustably located as appropriate for the width of the particular carrier-ribbon tape T by one or more transverse rods 10 having annular grooves as at 10', 10' and receiving the margin of locating apertures in the plates 9, 9. Forwardly beyond the supply well the tape is conducted in the forward and downward direction as indicated in FIG. 4, for passage between the feed rolls 6, 7, and thence forwardly across the stationary blade 30 of the severing means and on across the brush moistener contained in the reservoir 12, see FIG. 4. The tape guide means, which herein not only directs it longitudinally and in the vertical direction along the indicated path but also accurately aligns it transversely with respect to the supply roll S, the feed rolls and a length-controlling and cycle-halting circuit-controlling feeler element to be described, comprises an upper guide plate 40 and a lower guide plate 50 seen in FIG. 4 and separately in FIG. 9. The lower guide plate 50 has at the rear end a down-turned lip 51 by which it is supported on a cross-rod 52, with the forward and lower end of the plate held on or at the fixed blade 30. The upper guide plate 40 has a forwardly turned lip 41 engaged over a cross-rod 42 by which it is supported with capacity for vertical floating adjustive movement. It is held in appropriate vertically spaced relation to the lower guide plate 50 to provide between them a throat for passage of the tape, as by means of a down-turned finger 43 at a forward portion of the plate and adapted to rest on the under plate 50. Opposite the feed rolls 6, 7 the two guide plates have apertures through which the rolls are adapted to extend into feeding relation with the tape. Additionally the lower guide plate 50 is equipped with longitudinally extending walls or guide members 53, 55 transversely spaced by approximately the width of the main tape *t* and located and arranged for guiding cooperation with the side edges of the tape for causing it to travel with the length-controlling register apertures *a* thereof in proper correlation with the mentioned feeler element in the direction both lengthwise and transversely of the tape path. These lateral guides 53, 55 are formed on or secured to the upper face of the lower guide plate 50 as by horizontal attaching flanges 54, 56 at the outer lower longitudinal edges thereof and welded or otherwise secured to the guide plate 50. The rear ends of said lateral guides desirably are somewhat outwardly deflected for reception of the tape upon them as at 57, 58, FIG. 9. The upper guide plate 40 has a longitudinal slot 44 located to receive the left-hand guide 53 of the lower plate. Said upper guide plate 40 may be similarly apertured for reception of the right-hand guide 55 or as shown is laterally dimensioned so that the right side edge of the upper plate 40 terminates closely adjacent the guiding wall of said right-hand guide member 55 of the lower guide plate 50.

From the description of the special carrier-ribbon tape in connection with FIGS. 10 to 16 and as apparent from FIGS. 7 to 9, such tape comprises a number of parallel longitudinal zones. These zones herein include a medial zone as defined by the described carrier-ribbon R, and marginal zones along the respective sides of the medial ribbon zones. As explained, the respective end portions of the ribbon R of each carrier strip unit T*u* are adhesively laminated to the gummed underface of the main tape *t* while the handle-forming loop portions of the ribbon R are passed up through the body of the tape *t* as permitted by the slit *s* and end holes or enlargements *b*, *b*, with such loop portion exposed at and free from the body of the tape. Thus along the upper face of the tape *t* that is being advanced from the supply roll the loop or handle portions L while folded down flatwise against the tape are free to move with respect to it. Hence for accuracy in the feed of the tape it is undesirable that the engagement of the upper feed roll along and upon the tape should be at the medial zone of the ribbon R.

Accordingly the described guide means including the plates 9 of the tape well and the guides 53, 56 of the lower guide plate 50 adjacent the feed rolls are constructed, arranged and located with respect to the tape path and to the position of the upper feed roll 7 that the feeding engagement by the latter is effected along one of the marginal zones of the tape, herein that at the right in FIG. 9 or along the lower portion of FIG. 10. Likewise the upper feed roll 7 itself is laterally dimensioned, and in the illustrated example of lesser width than the lower feed roll 6 so that feeding contact by the upper roll 7 upon the tape occurs only along the herein right-hand marginal or feed zone of the tape. A marginal zone at the other side of the medial ribbon zone, that at the left in FIG. 9 or the upper portion along FIG. 10, is utilized for cooperation of the length-controlling feeler with the register apertures or slots *a* of the tape.

The mentioned feed length controlling and cycle-halting trip switch or feeler element is designated generally at 60, FIGS. 2 and 4 to 8, and seen separately in FIG. 9. It comprises a microswitch device or switch body 61 having a downwardly biased feeler element or finger 62. The switch body 61 is suitably mounted on a fixed part within the machine housing and is positioned to present the feeler finger 62 of the switch with its lower end in longitudinal line with the areas of the tape register apertures *a* which occur at the herein left-hand or length-controlling marginal longitudinal zone of the tape *t*, that seen at the top in FIG. 10. Conveniently for such mounting purposes the switch body 61 is secured at the outer side thereof to a mounting block 64 in turn secured to the adjacent side frame 2 at a location above and behind the movable blade 20 of the severing means and non-interferently below the yoke 21 pivoted on a cross-shaft 22 and connected as by link 23 to the carrier 24 of the blade proper 20, said knife-supporting parts being generally similar as in the application and patent mentioned.

The pendent lower end 63, FIG. 9, of the trip switch feeler 62 is of a size and shape to drop into and through each of the tape register apertures *a* as the latter come oppositely below it in the feed of the tape. To afford access for the feeler 62 to the upper face of the tape along the mentioned length-measuring zone thereof, the upper guide plate 40, noting particularly FIG. 9, is formed with a longitudinal through recess 46 through which the feeler is adapted to operate. In further cooperation with the feeler 62 and with the register apertures *a* of the tape provision is made whereby adequate downward movement for the feeler 62 through a presented tape aperture *a* is provided to assure switch-actuating feeler movement and at a location along the tape path where the tape is positively supported. Conveniently such location is directly at and above the fixed blade 30. Accordingly said blade 30 as best seen in FIG. 4 is formed with a vertical recess or aperture 35, also seen dotted in FIG. 9, in vertical line with the feeler 62 and with the tape register apertures *a*.

The microswitch 61 has the make and break element thereof normally open; that is, when a register aperture *a* of the tape comes oppositely below the feeler the latter under the down-biasing spring action of the switch drops into and through the tape aperture *a* and preferably somewhat below it into the clearance recess 35 of the tape-supporting fixed blade 30. This causes the feeler 62 to assume its downward normal or cycle-halting position as at the end of and in inactive or non-feeding periods between cycles for the machine. When the machine is actuated to start a cycle, by foot or manual operation of a starter control switch by the operator of the machine, the tape rolls 6, 7 are closed by energizing of the solenoid 15 and running of the motor M so that the tape starts to feed. The initial forward movement of the tape lifts the tip 63 of the feeler 62 of the trip switch 60 and closes and maintains the operating circuit at said switch 60. The cycle continues and the tape is fed, with the feeler 62 riding along upon the upper face of the tape at the length-controlling zone until the next register aperture *a* in the tape comes opposite the feeler, whereupon it falls into and through such aperture. This causes the switch 60 to open and to terminate the operating cycle, including halt of the feed by separation of the feed rolls 6, 7 and actuation of the movable blade 20 of the severing means. An accurately registered cut-off of the tape into the described unit lengths as appropriate for each of the carrier handle units T*u* is thus afforded.

Figures 17, 18:
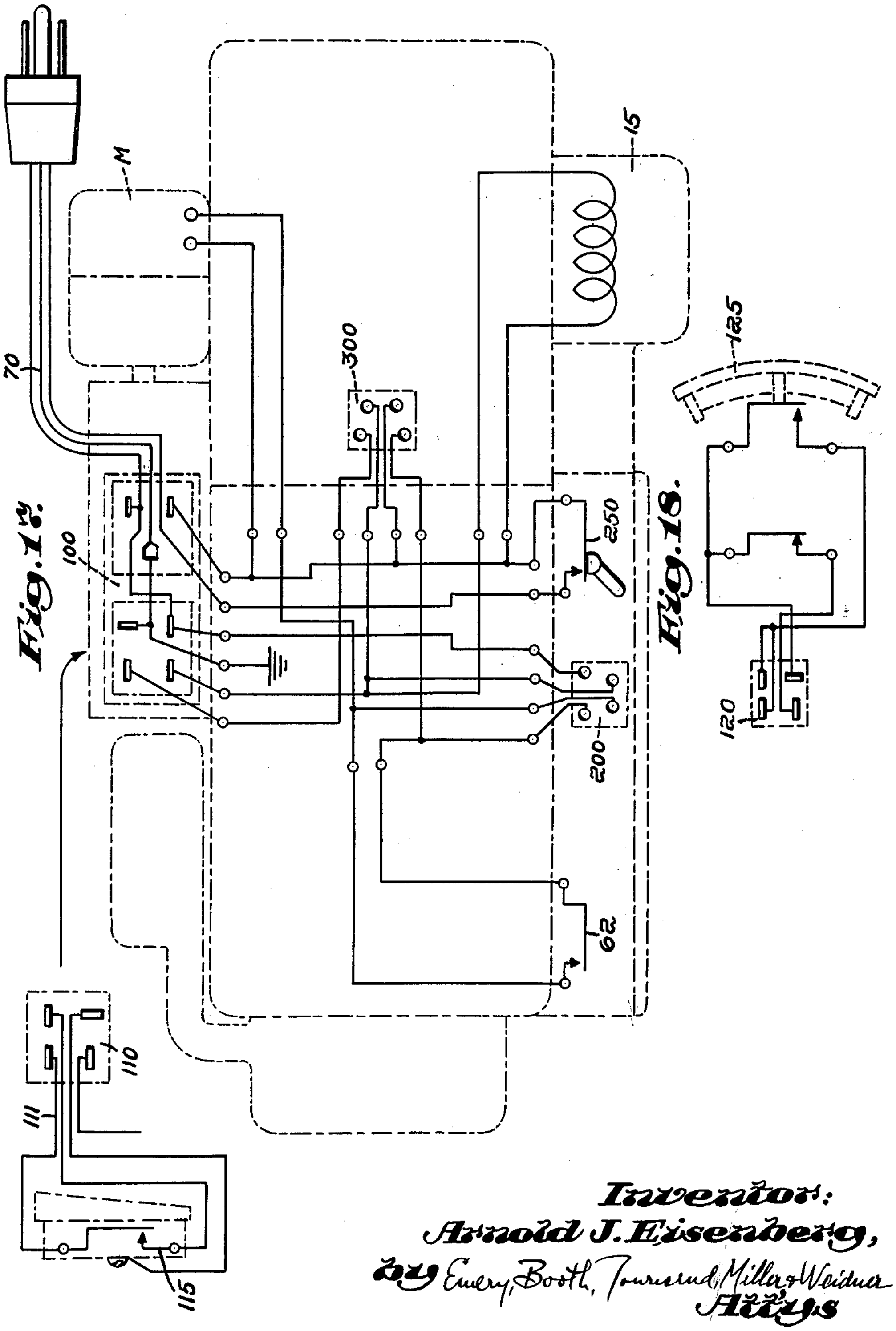
FIG. 17 is a wiring diagram.
FIG. 18 shows schematically and with wiring diagram a manual cycle starting device useful with or in lieu of the foot operable starter of FIG. 17.

The operating and control circuitry for the machine, as illustrated in the diagrams of FIGS. 17 and 18, is generally similar as in the mentioned application. The machine is equipped with power supply lines 70 and with junction boxes and control outlets as at 100, 200 and 300, desirably also including a master control switch 250. One portion of the outlet 100, that at the left in FIG. 17, is wired to receive the connector plug 110 secured to the cord 111 of a foot operable starter switch 115 located adjacent the machine and conveniently accessible to the operator.

Alternatively, or in addition to such foot operable switch, a manual switch 125 mounted on the machine as in said mentioned application may be provided having a connector plug 120 for said outlet 100. Otherwise the circuitry may be generally similar as in connection with the cycle-halting trip switches of the stated application. Thus herein the tape-length registering and cycle-terminating feeler-controlled trip switch element 60 functions in the manner of a holding switch for the operating circuit, once feed of the tape is started by the operator by his actuation of the foot or the manual switches described.

From the diagram of FIG. 17 in conjunction with the other figures it is apparent, noting particularly FIGS. 3 and 4, that the cord 66 containing the conductor leads for the trip switch 60 having the tape-actuated feeler 62 cooperable with the register apertures *a* of the tape, has at one end a connection plug 68 for plug-in connection at the socket-type connection receptacle 200, at the right-hand side of the machine and within the side cover plate 5, similarly as for the different selective feed length control elements of said application Serial No. 845,126. Likewise it will be understood that the foot-operable cycle-starting switch such as 115 provided for the operator has the lead-containing cord 111 thereof provided at the end distal to the switch with a plug 110 for plug-in reception at the switch side of the outlet block 100, at the left-hand side of the machine, as in the example of said application. Since in the described circuitry hook up for the predetermined-length register-aperture controlled special tape dispensing in accordance with the present invention but one cycle-terminating trip switch need be employed, the junction box receptacle 300 for a by-passing relay for such second or other trip switch and circuit, seen at the right central portion of FIG. 17, may be omitted or operatively disregarded. Also it is evident that where a manual switch as 125 of FIG. 18 is desired either alternatively or in addition to the foot switch 115 for cycle starting at the will of the operator, the connection plug 120 of such manual switch is associated with said switch side of the outlet 100. The power supply line, conveniently connected to a junction box or the like associated with the outlet 100 as indicated in FIG. 17, is seen at 70 in FIGS. 1, 2 and 5.

Referring again to FIGS. 10 to 16 and to the machine views as correlated with the special carrier-ribbon tape there illustrated, it is seen that in this example the length-determining register holes *a* extend to both sides of the longitudinal central zone along which the carrier-ribbon R is located. Hence with the cooperative construction and arrangement and widthwise proportioning of the upper feed roll 7 and of the trip switch feeler 62 the carrier-ribbon tape of the example may be dispensed in either direction with reference to the carrier-ribbon loop L and the fold L′ thereof, although preferably the winding of the tape in the roll supply and the installation of the roll into the supporting well 3 of the machine is such that in the feed of the tape the flat bent portion of the loop L′ trails. Likewise the location of the trip switch feeler 62 with respect to the tape path may provide for circuit-making or holding and for circuit-breaking coaction with the tape along a longitudinal zone thereof at either side of the preferably medial or otherwise locatable carrier-ribbon zone of the tape, the feed roll acting along a third longitudinal zone of the tape whether at the same side of the carrier-ribbon zone or at opposite sides thereof.

In the operation of the machine it is noted that the starting of the tape feed is substantially instantaneous in response to actuation of the cycle-starting switch by the operator, so that the tape-actuated trip switch 60 is immediately shifted by the tape, into circuit-maintaining position, from which it is ready to move into the next following register aperture *a* thereby to return to its normal or inactive between-cycle position, effecting opening of the circuit and shutting down the machine. Should it nevertheless be found desirable to insert a holding switch in the circuit controlled by the operator's starting switch, to take care of any remote possibility of delay in feeding movement of the tape adequate to close the described normal opened tape-actuating trip switch 60, then the tape-actuated trip switch may be arranged in circuit with such holding switch and may be of the type, e.g. normally closed, so as to be shifted by feeding passage of the tape across it to the opposite status and readied to enter a tape register aperture *a* to effect closure of a circuit for causing reopening of the holding switch thereby to shut down the machine.

My invention is not limited to the particular embodiments thereof illustrated and described herein, and I set forth its scope in my following claims.

I claim:

1. In a tape dispensing machine having separable feed rolls closeable to feed adhesively conditionable tape between them, means adhesively to condition the tape as fed and means for severing fed tape lengths and having a motor to drive the rolls and electrically controlled actuator means to close and to open the rolls and to actuate the severing means, the combination in said machine of auxiliary means for rendering the same operable to dispense automatically in successive power-actuated operating cycles on call by the operator tape lengths as predetermined by longitudinally spaced register apertures in the tape, said auxiliary means comprising conductor means defining a circuit containing the motor and said actuator means, an operator-controlled switch in the circuit to establish the same for closing the rolls and starting the feed, and an automatic trip switch in the circuit having an actuating feeler for maintaining the circuit by engagement of the feeding tape with the feeler between register apertures of the tape and for controlling the circuit upon disengagement of the tape and feeler at the next succeeding tape aperture thereby to trigger actuation of the severing means and separation of the feed rolls and termination of the operating cycle.

2. The tape dispensing machine of claim 1 wherein the base machine and the operating circuitry therefor includes a plug-in-type connection receptacle for the trip switch, a plug-in type outlet for attachment of the operator-controlled starter switch, and associated power-supply conduit, and said trip switch and said starter switch have conductor lead cords with terminal plugs for reception at said receptacle and outlet respectively on the machine.

3. A tape dispensing machine according to claim 1 constructed and arranged to serve unit lengths of tape as determined by register apertures provided at longitudinally spaced points along one lengthwise zone of the tape and the tape provided in the lengths between succeeding apertures with a carrier-ribbon presenting at the non-adhesively conditionable face of the tape a loop to form a hand hold, one of the feed rolls proportioned and located relatively to the tape feed for feeding engagement at a longitudinal zone of the tape to one side of such carrier-ribbon and spaced widthwise of the tape from the register apertured zone thereof and the trip switch feeler disposed for tape engagement along such register apertured zone.

4. A tape dispensing machine according to claim 3 wherein said one feed roll and said trip-switch feeler are operatively disposed at opposite sides of the longitudinal median line of the tape path.

5. A unit-length tape dispensing machine particularly adapted for serving unit lengths of carrier-ribbon tape from a roll supply upon call by the operator, which tape has a unit length-determining register-aperture zone, a carrier ribbon zone and a roll-engageable feeding zone in transversely spaced parallel longitudinal relation, comprising a frame, a pair of separable feed rolls thereon, a motor connected to drive one roll, electro-magnetic means to effect feeding engagement and disengagement of the rolls to start and stop the feed, tape severing means correlated with said means to effect severance of the fed tape unit, guide means defining a feed path for the tape aligned lengthwise and positively located widthwise of the machine, an operating circuit containing the motor and electro-magnetic means, an operator-controlled starter switch for the circuit, and an automatic circuit maintaining and breaking trip switch actuatable by the tape as fed to condition it for operation on arrival of a tape register aperture operatively opposite the switch so as to cause feed roll separation and actuation of the tape severing means.

6. The machine of claim 5 wherein the trip switch has a feeler in alignment with the register-aperture zone of the tape path and biased to enter each successively arriving such aperture of the tape thereby to halt the feed at each unit length of the tape and to effect tape severance.

7. The machine of claim 6 wherein one feed roll is located for feeding engagement only with a zone along the tape path other than said register-aperture zone and said feeler and said feed roll are each offset transversely from the carrier-ribbon zone of the tape path.

8. The machine of claim 6 wherein the guide means includes a supporting member below the tape path at the location of the trip switch feeler and across which the tape is fed, said member being recessed to provide for movement of the feeler transversely through a tape register aperture and sufficiently beyond the tape to insure operation of the trip switch by said feeler movement and reverse operation of the switch by retraction of the feeler from the register aperture by coaction of the tape on starting of the next tape feed.

9. The machine of claim 8 wherein said tape supporting member is a fixed blade of the severing means.

10. The machine of claim 5 wherein the guide means includes upper and lower guide plates respectively above and below the tape path between the feed rolls and the severing means, the upper plate mounted for lifting movement from the lower plate and having means normally locating it in spaced throat-forming relation to the lower plate, and the lower plate having upstanding parallel lateral guide walls transversely spaced for guiding cooperation with the longitudinal edges of the tape.

11. The machine of claim 10 wherein the upper plate is shaped, constructed and arranged to afford upward projection of the lateral guide walls of the lower plate at least to the normal level of the upper plate thereby to define with said upper plate a fully enclosing longitudinal throat formation for guidance of the tape in accurate alignment with the tape path upon the machine.

References Cited in the file of this patent

UNITED STATES PATENTS

| | | |
|---|---|---|
| 1,090,388 | Foote | Mar. 17, 1914 |
| 1,843,161 | Ingram | Feb. 2, 1932 |
| 2,405,790 | Krueger | Aug. 13, 1946 |
| 2,674,308 | Knobel | Apr. 6, 1954 |